United States Patent [19]
Wang

[11] Patent Number: 5,203,848
[45] Date of Patent: Apr. 20, 1993

[54] TELEVISION GAME CONSOLE AND ELECTRONIC CONTROL DEVICE FOR CONTROLLING THE ALLOWABLE PLAYING TIME OF THE TELEVISION GAME CONSOLE

[75] Inventor: Jack Y. Wang, Paipei, Taiwan

[73] Assignees: Myson Technology, Inc., Cupertino, Calif.; Myson Technology, Inc., Taipei, Taiwan

[21] Appl. No.: 821,701

[22] Filed: Jan. 16, 1992

[51] Int. Cl.$^5$ .............................................. A63F 9/22
[52] U.S. Cl. ............................... 273/435; 273/148 B; 273/434; 273/DIG. 28
[58] Field of Search ............... 273/433, 434, 435, 436, 273/437, 439, DIG. 28, 148 B, 85 G; 364/410

[56] References Cited
U.S. PATENT DOCUMENTS

| | | |
|---|---|---|
| 4,352,492 | 10/1982 | Smith ................................. 273/434 |
| 4,922,420 | 5/1990 | Nakagawa et al. ............. 273/148 B |
| 5,078,399 | 1/1992 | Lennon, Jr. ........................ 273/434 |
| 5,112,051 | 5/1992 | Darling et al. .................. 273/148 B |

Primary Examiner—Jessica J. Harrison
Attorney, Agent, or Firm—Limbach & Limbach

[57] ABSTRACT

A television game console has a central processing unit and an electronic control device for controlling the allowable playing time of the television game console. The electronic control device includes a timer control device which interfaces the central processing unit with a game cartridge read only memory unit. The timer control device has a current time clock output and receives a presettable allowable playing time range input from the central processing unit. The timer control device electrically connects the game cartridge read only memory unit and the central processing unit only when the current time clock output is within the allowable playing time range.

6 Claims, 5 Drawing Sheets

5,203,848

TELEVISION GAME CONSOLE AND ELECTRONIC CONTROL DEVICE FOR CONTROLLING THE ALLOWABLE PLAYING TIME OF THE TELEVISION GAME CONSOLE

BACKGROUND OF THE INVENTION

1. Field of the Invention

The invention relates to a television game console, more particularly to a television game console having an electronic control device for controlling the allowable playing time thereof.

2. Description of the Related Art

FIG. 1 is a schematic block diagram of a conventional television game console (10). The television game console (10) comprises a central processing unit (CPU) (10), a video processor unit (12), a video random access memory (RAM) (13), an audio processor unit (14), an audio RAM (15) and a radio frequency (RF) modulator (16). The television game console (10) is provided with a socket connector (17) which detachably receives a game cartridge read only memory (ROM) (18). The game cartridge ROM (18) contains a game software and has address bus (AB) and data bus (DB) lines connected to the CPU (11). The CPU (11) provides audio and video signals to the audio and video processor units (12, 14). The audio and video processor units (12, 14) store audio and video data in the audio and video RAM (13, 15). The composite audio and video outputs of the audio and video processor units (12, 14) are sent to the RF modulator (16) for further processing prior to reception by the television unit.

Note that the conventional television game consoles are not provided with a timer control device which automatically disables the television game console after a preset time period of use. Thus, it is not uncommon to see many children and adults who eat and sleep at irregular times because of prolonged operation of the television game consoles.

SUMMARY OF THE INVENTION

Therefore, the objective of the present invention is to provide a television game console having an electronic control device for controlling the allowable playing time thereof.

Accordingly, the preferred embodiment of a television game console of the present invention comprises a central processing means and an electronic control device for controlling the allowable playing time of the television game console. The electronic control device includes a timer control device which interfaces the central processing means with a game cartridge read only memory unit. The timer control device has a current time clock output and receives a presettable allowable playing time range input from the central processing means. The timer control device electrically connects the game cartridge read only memory unit and the central processing means only when the current time clock output is within the allowable playing time range.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
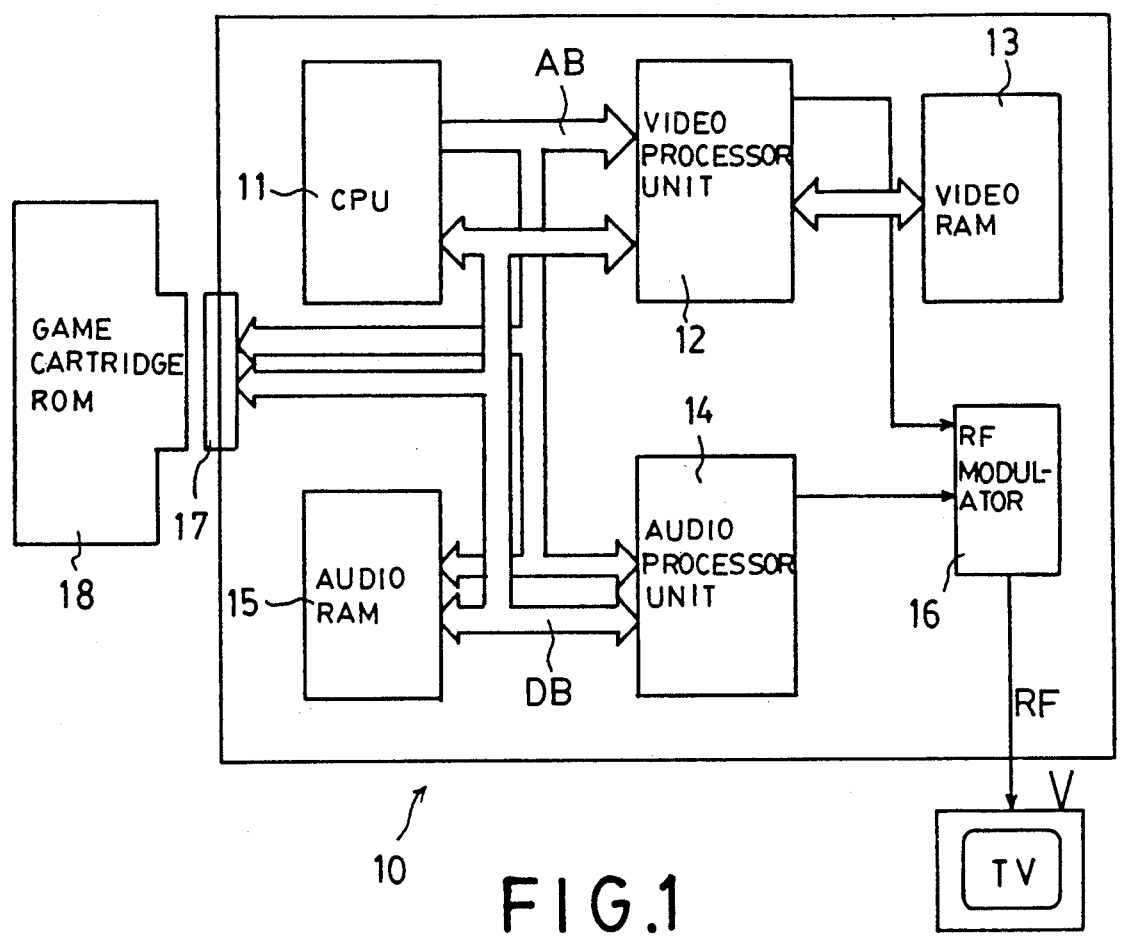
FIG. 1 is a schematic block diagram of a conventional television game console.
Figure 2:
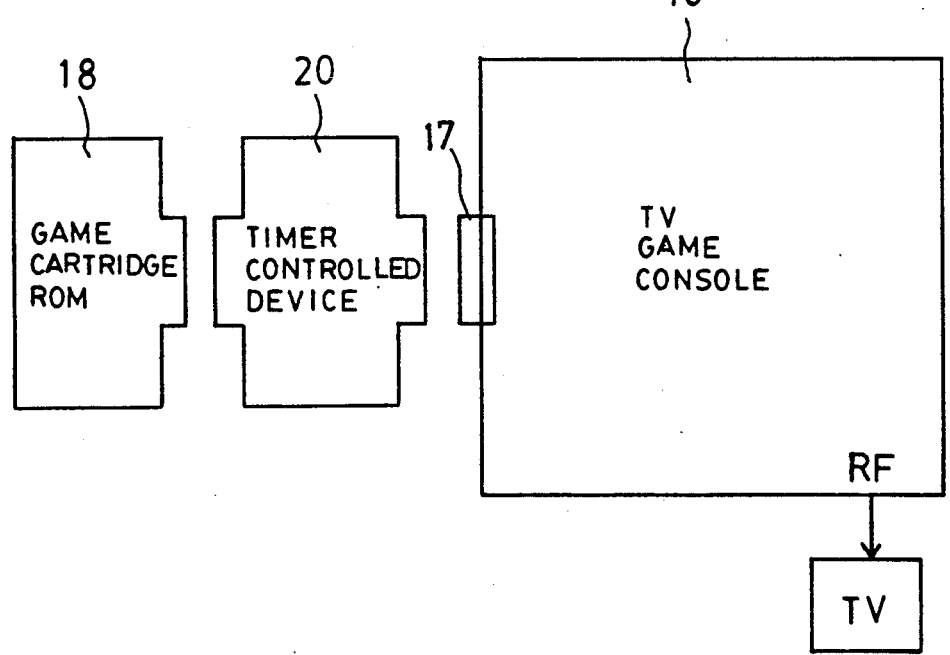
FIG. 2 is a block diagram illustrating the preferred embodiment of a television game console according to the present invention when in use.

Referring to FIG. 2, the preferred embodiment of an electronic control device for the television game console of the present invention comprises a timer control device (20) which is used to interface the television game console (10) and a game cartridge ROM (18). The timer control device (20) has an input end detachably connected to the game cartridge ROM (18) and an output end provided with a key-operated latch (not shown) for securing the timer control device (20) onto the socket connector (17) of the television game console (10). [Note that the electronic control device can also be directly installed or incorporated into the television game console (10)].

Figure 3:
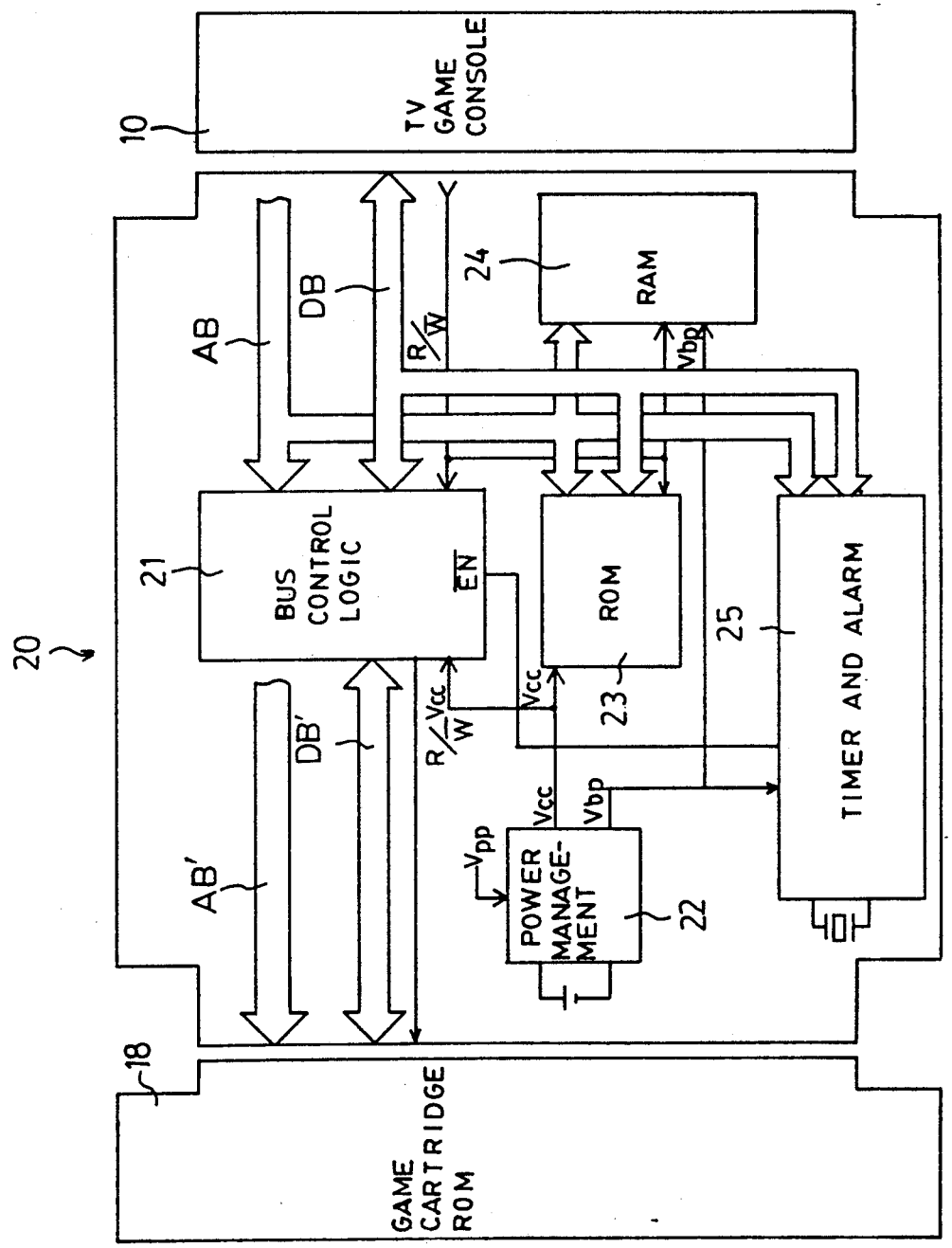
FIG. 3 is a schematic circuit block diagram of the preferred embodiment.

FIG. 3 illustrates a schematic circuit diagram of the timer control device (20). The timer control device (20) includes a bus control logic means (21), a power management circuit means (22), a read only memory (ROM) unit (23), a random access memory (RAM) unit (24) and a timer and alarm circuit (25).

Figure 4:
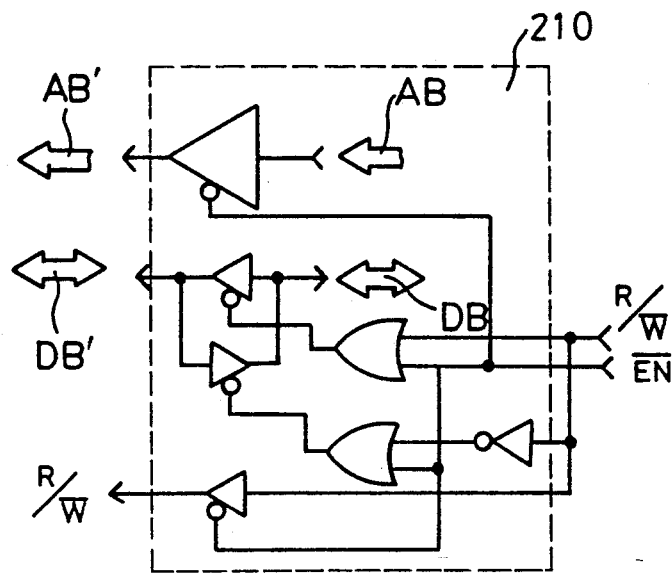
FIG. 4 is a schematic electrical circuit diagram of a bus control logic means of the electronic control device of the preferred embodiment.

The schematic electrical circuit diagram of the bus control logic means (21) is shown in FIG. 4. The bus control logic means (21) comprises a tri-state buffer means (210) having a first set of address bus lines (AB') and data bus lines (DB') connected to the game cartridge ROM (18) and a second set of address bus lines (AB) and data bus lines (DB) connected to the CPU (11) of the television game console (10). A /EN disable signal controls the buffer means (210) to act as a switch. A R/$\overline{W}$ signal controls the transfer of data between the game cartridge ROM (18) and the television game console (10). If R/$\overline{W}$=1, data from the game cartridge ROM (18) is sent to the CPU (11). If R/$\overline{W}$=0, data from the CPU (11) is sent to the game cartridge ROM (18). Data transfer between the game cartridge ROM (18) and the CPU (11) can only occur when /EN=0. When /EN=1, the buffer means (210) is in a high impedance state, thereby breaking the electrical connection between the first and second set of address lines (AB', AB) and the first and second set of data lines (DB', DB).

Figure 5:
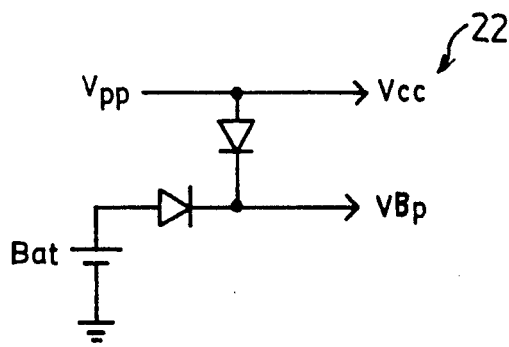
FIG. 5 is a schematic electrical circuit diagram of a power management circuit means of the electronic control device of the preferred embodiment.

The schematic electrical circuit diagram of the power management circuit means (22) is shown in FIG. 5. The voltage signal (Vpp) is received from the television game console (10) and is equal to 5 volts. The power management circuit means (22) has two voltage outputs. The first voltage output (Vcc) supplies the required electrical power to the bus control logic means (21) and to the ROM unit (23) when the preferred embodiment is activated. The second voltage output (Vbp) serves as an uninterruptible power signal to the RAM unit (24) and to the timer and alarm circuit (25). When the television game console (10) is activated, Vpp =Vcc=5 volts, and Vbp=4.4 volts. When the television game console (10) is turned off, Vpp=Vcc=0 volts, and Vbp=3 volts. The power management circuit means (22) includes a cell means (Bat) which may be a rechargeable NiCd battery, a lithium cell or a ZnC dry cell. The ROM unit (23) contains a disable routine which is retrieved by the CPU (11) of the television game console (10) when the latter is activated. The size of the disable routine (preferably between 8 K×8 and 64 K×8) corresponds to the type of television game console (10) in use. The disable routine is responsible for a large portion of the "human interfaces," such as displaying code setting and time setting instructions on the television screen.

The RAM unit (24) is a 64-bit static ram memory device and is used to store an access code and a presettable allowable playing time range input from the CPU (11). The voltage output (Vbp) supplies the required electric power to the RAM unit (24) so as to prevent data loss. The RAM unit (24) is energy efficient since it requires a relatively small amount of current when in operation (typically in the $\mu$A range).

Figure 6:
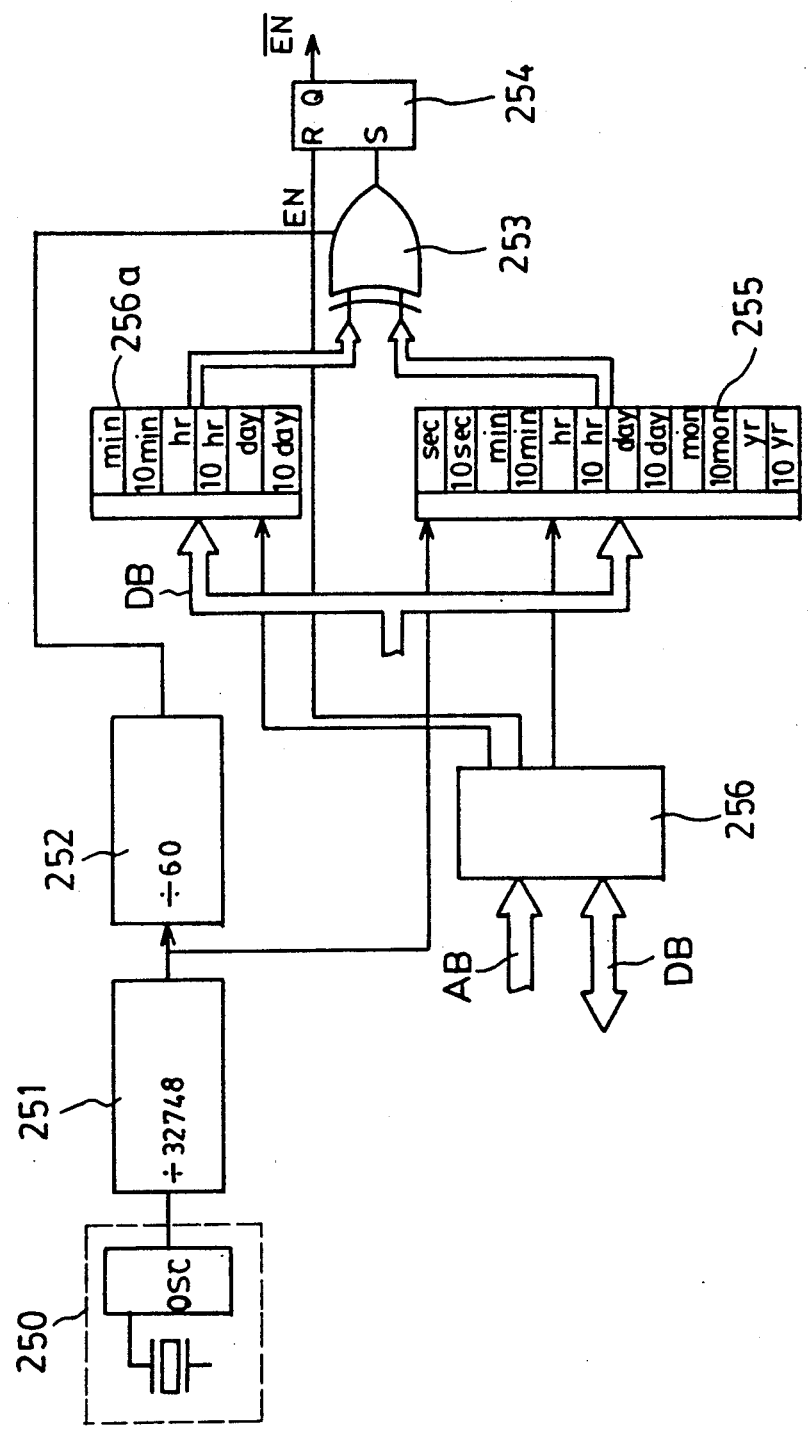
FIG. 6 is a schematic block diagram of a timer and alarm circuit of the electronic control device of the preferred embodiment.

The schematic circuit block diagram of the timer and alarm circuit (25) is shown in FIG. 6. The timer and alarm circuit (25) includes a quartz crystal oscillator (250) for providing a 32,768 Hz clock signal and a frequency divider means 251) for dividing the 32,768 Hz clock signal so as to obtain a 1 Hz signal. The 1 Hz signal is used as a clock input to a counter means (255). The counter means (255) can be operated as a perpetual clock and is presettable so as to be adapted for use in different time zones. The timer and alarm circuit (25) further comprises a timer means (256) which includes a timer latch (256a) and which is connected to the second set of address and data bus lines (AB, DB). The CPU (11) writes time data retrieved from the RAM unit (24) into the timer means (256). Note that the operation of the timer and alarm circuit (25) should be continuous regardless of whether or not the television game console (10) is in use. Thus, the voltage output (Vbp) of the power management circuit means (22) should be used to drive the timer and alarm circuit (25) so as to permit accurate and continuous operation of the same. The voltage output (Vbp) of the power management circuit means (22) is approximately 3 volts when the television game console (10) is deactivated and is approximately 5 volts if otherwise.

The 1 Hz signal from the frequency divider means (251) is processed by a second frequency divider means (252) which divides the 1 Hz signal by a factor of 60 so as to obtain an EN enable signal. The EN enable signal is used to control a comparator (253). The comparator (253) has a first set of input terminals connected to the counter means (255) and a second set of input terminals connected to the timer means (256). The comparator (253) detects a condition wherein the current time clock output of the counter means (255) corresponds with the time data of the timer means (256). If such a condition is detected, the comparator (253) generates a pulse signal to a latch (254) so as to enable the latter to generate the /EN disable signal. The /EN disable signal is received by the bus control logic means (21) so as to break the electrical connection between the first and second set of address lines (AB', AB) and the first and second set of data lines (DB', DB).

Figure 7:
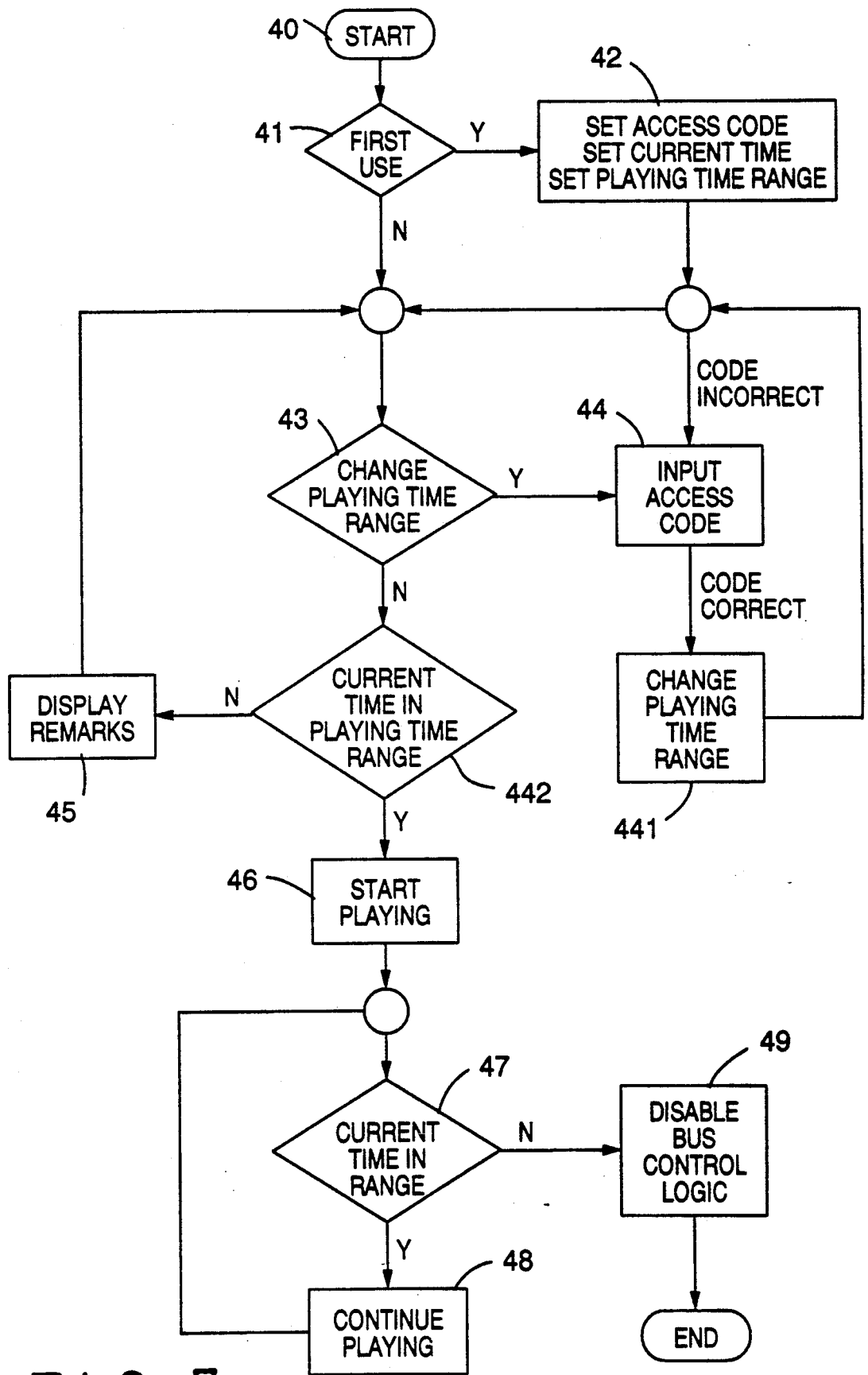
FIG. 7 is a flowchart illustrating the operation of the television game console of the present invention.

FIG. 7 is a flowchart illustrating the operation of the preferred embodiment. The timer control device (20) is first mounted on the television game console (10). When the television game console (10) is activated, a POWER ON signal (not shown in the drawings) is transmitted to the latch (254) so as to generate the /EN disable signal and break electrical connection between the CPU (11) and the game cartridge ROM (18). The CPU (11) can thus retrieve program instructions from the ROM (23). When the television game console (10) is activated (Step 40), the CPU (11) initially verifies if it is the first time to use the timer control device (20) (Step 41). If it is the first time to use the timer control device (20), the game controller (not shown) of the television game console (10) is operated so as to set an access code, the current time and a presettable allowable playing time range (Step 42). Otherwise, a query is shown on the television screen so as to ask the user if it is desired to change the allowable playing time range (Step 43). The access code must be properly entered before the allowable playing time range can be changed (Step 44). Step 43 is again executed when the access code is correct and changing of the allowable playing time range has been accomplished (Step 441). The allowable playing time range cannot be changed if it has been detected that an incorrect access code has been entered. Step 43 is again executed.

If it is not desired to change the allowable playing time range, the CPU (11) initially checks if the current time is within the allowable playing time range (Step 442). If the current time is not within the allowable playing time range, remarks (such as "It is not the time to play") are displayed on the television screen (Step 45) and Step 43 is again executed. If the current time is within the allowable playing time range, the latch (254) is reset so as to remove the /EN disable signal, thereby allowing the use of the television game console (10) (Step 46). At this stage, the comparator (253) checks whether the current time clock output of the counter means (255) is within the allowable playing time range (Step 47). Step 47 is again executed if the current time is within the allowable playing time range (Step 48). When the current time clock output of the counter means (255) becomes equal to the upper limit of the allowable playing time range [found at the output terminals of the timer means (256)], the comparator (253) generates a pulse to the latch (254) so as to activate the latter and generate the /EN disable signal to place the bus control logic means (21) in the high impedance state, thereby breaking the electrical connection between the game cartridge ROM (18) and the CPU (11) of the television game console (10) (Step 49). This illustrates how the present invention meets the objective of providing a television game console with an electronic control device for controlling the allowable playing time of the television game console.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. An electronic control device for controlling the allowable playing time of a television game console, said electronic control device comprising a timer control device for interfacing said television game console with a game cartridge read only memory unit, said timer control device including a means for generating a current time clock output, a means for receiving a presettable allowable playing time range input from said television game console, and a means for electrically connecting said game cartridge read only memory unit and said television game console only when said current time output is within said allowable playing time range input.

2. The electronic control device as claimed in claim 1, wherein said timer control device comprises: p1 a timer and alarm circuit means including a counter means for generating said current time clock output, and a means for generating a disable signal when said current time clock output is not within said allowable playing time range input; and a tri-state bus control logic means for receiving said disable signal, said tri-state bus control logic means connected between a first set of address bus lines and data bus lines connected to said game cartridge read only memory unit and a second set of address bus lines and data bus lines connected to said television game console, wherein said bus control logic means enters a high impedance state upon reception of said disable signal so as to break electrical connection between said game cartridge read only memory unit and said television game console.

3. The electronic control device as claimed in claim 2, further comprising a cell means for continuously supplying electric power to said timer and alarm circuit means.

4. A television game console comprising a central processing means and an electronic control device for controlling the allowable playing time of said television game console, said electronic control device including a timer control device for interfacing said central processing means with a game cartridge read only memory unit, said timer control device including means for generating a current time clock output, a means for receiving a presettable allowable playing time range input from said central processing means, and a means for electrically connecting said game cartridge read only memory unit and said central processing means only when said current time clock output is within said allowable playing time range input.

5. The television game console as claimed in claim 4, wherein said timer control device comprises:

a timer and alarm circuit means including a counter means for generating said current time clock output, and a means for generating a disable signal when said current time clock output is not within said allowable playing time range input; and a tri-state bus control logic means for receiving said disable signal, said tri-state bus control logic means connected between a first set of address bus lines and data bus lines connected to said game cartridge read only memory unit and a second set of address bus lines and data bus lines connected to said central processing means, wherein said bus control logic means enters a high impedance state upon reception of said disable signal so as to break electrical connection between said game cartridge read only memory unit and said central processing means.

6. The television game console as claimed in claim 5, wherein said central processing means comprises:

range setting means for setting said allowable playing time range input wherein said range setting means receives a preset access code input and an input access code, and wherein the range setting means includes means for permitting the resetting of said allowable playing time range input only when said input access code matches said preset access code input.

* * * * *